July 4, 1944. H. C. McMAHON 2,352,727
SAFETY WINDSHIELD AND MOUNTING
Filed Dec. 15, 1942
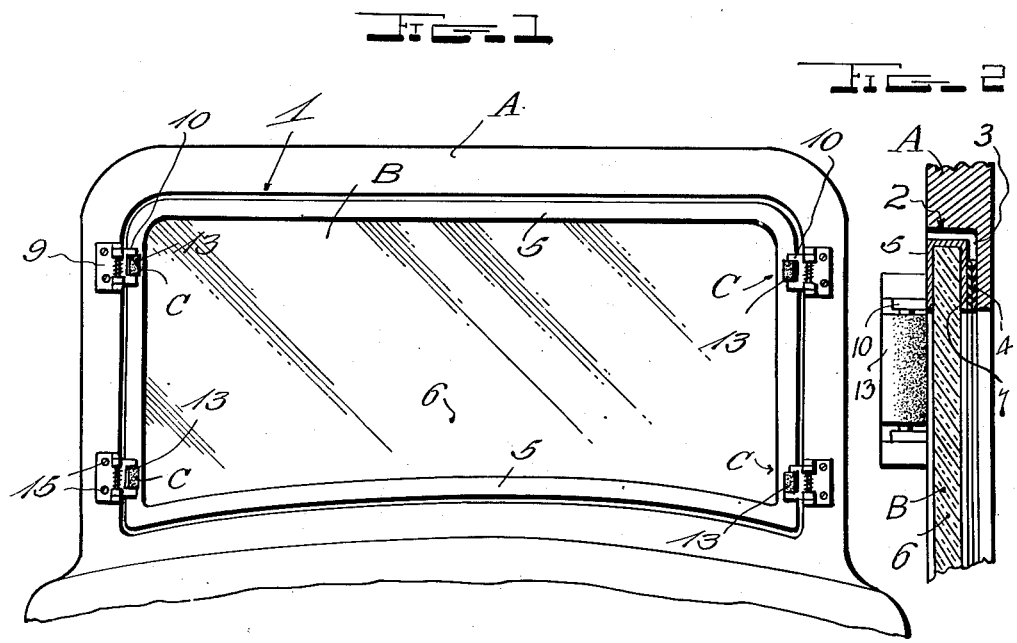
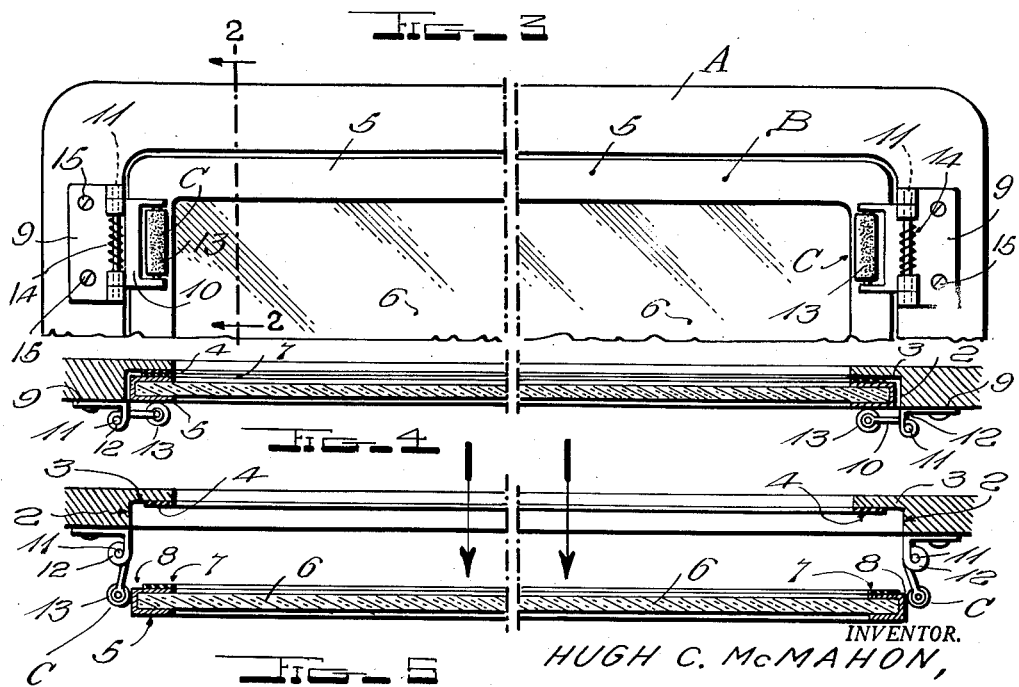
INVENTOR.
HUGH C. McMAHON,
BY
Shrev, Crowe + Gordon
ATTORNEYS Patented July 4, 1944

2,352,727

UNITED STATES PATENT OFFICE 2,352,727

SAFETY WINDSHIELD AND MOUNTING

Hugh C. McMahon, Washington, D. C.

Application December 15, 1942, Serial No. 469,099

1 Claim. (Cl. 296—84)

Generically this invention relates to visible windshields of automobiles and the like, but it is more particularly directed to means for mounting and releasably retaining the windshield in its normal position.

One of the principal objects of this invention is the provision of means attached to an automobile body, having yieldable detachable engagement with the windshield, and adapted to normally maintain the windshield in position.

Another important object of this invention is the provision of a windshield, its mounting and means carried by an automobile body adapted to engage and exert a yieldable force on the windshield to maintain the same in its normal position and prevent it jarring loose or rattling even under rough vehicular travel, and at the same time permitting its ready release upon the application of any force thereto from the inside of the car, and thereby preventing injury to passengers by the impact occasioned by a sudden stopping of the car.

A still further object of this invention is the provision of a shock-absorbing friction windshield supporting means, and yieldable retaining means adapted to forcibly and compensatingly maintain the windshield in its normal position, irrespective of wear or jarring movement, yet permitting its limited movement without separation from said retaining means or complete displacement depending upon the amount of force applied thereto from within the car, and its ready return to normal position.

With these and other objects in view, which will become apparent as the description proceeds, the invention resides in the construction, combination and arrangement of parts, hereinafter more fully described and claimed, and illustrated in the accompanying drawing, in which like characters of reference indicate like parts throughout the several figures, of which:

Fig. 1 is a front elevation of the windshield and mounting.

Fig. 2 is an enlarged cross section on the line 2—2 of Fig. 3.

Fig. 3 is a fragmentary elevation similar to Fig. 1.

Fig. 4 is a longitudinal section showing the windshield and retaining means in normal position.

Fig. 5 is a similar view to Fig. 4 showing the windshield moving out and about to be released by the yieldable retaining means.

The devices of this character with which I am familiar have proven deficient in many respects, such as presenting complex structures expensive to produce and difficult to install, requiring special windshield construction, requiring manual adjustment of parts to effect its return to its normal position, etc., and it was to overcome these and other disadvantages by providing a simple, inexpensive, easily installable windshield and shock-absorbing or cushion means, without requiring material change to either the windshield or car body structures, said retaining means adapted to exert a continuous force on said windshield to compensatingly maintain the same in seating engagement with said cushion means irrespective of wear and tear and jarring movement thereof during rough vehicular travel, and automatically yieldable to permit its partial or complete displacement depending upon the force exerted thereon from within the car without marring or damage thereto and adapted to permit its ready replacement, that I designed the device forming the subject matter of this invention.

In the illustrated embodiment characterizing this invention there is shown an automobile body A, and windshield B.

The body A is formed with an opening 1 and a recess 2 having a lateral seat 3 surrounding said opening and superimposed on seat 3 and adhesively or suitably secured thereto is a shock-absorbing or cushion element 4 of rubber, felt, or other suitable resilient material.

The windshield B comprises a substantially rectangular frame 5 in which is suitably mounted a glass pane or other transparent element 6. A shock-absorbing or cushion element 7, similar to element 4, or of any suitable resilient material is adhesively or otherwise secured to the inner or contact face 8 of said frame 5. Said windshield B is adapted to close opening 1 and is mounted in recess 2 with the cushion element 7 in frictional engagement with the resilient member 4.

The windshield B is normally retained in seated position in recess 2 by a plurality of yieldable pressure devices C, in the present instance four, one at substantially each corner of the windshield, though it is to be understood that I am not limited to any specific number or location, since they may be applied to the sides as well as the ends, and their lengths increased so as to have one of a greater length at the respective ends and sides, if desired, without departing from the scope or spirit of the invention.

Each of the respective yieldable pressure devices C comprises an anchor plate 9 and roller plate 10 hingedly connected by a hinge pin 11, said hinge connection being offset with respect to said plate 9 by the portions or ears 12 extending at right angles from said plate 9. Said plate 10 carries at its free end a journaled roller 13 of rubber or other suitable resilient or non-scarring material. In order to normally effect a continuous pressure on the windshield B in retaining direction (Fig. 1), a coil spring 14 is mounted on hinge pin 11 with one end seating on plate 9 and the other end on plate 10. Said plate 9 is perforated to receive, in the present instance, the screws 15 adapted to secure said plate to body A.

In operation it will be apparent that normally when the windshield B is in position in recess 2 its cushion facing 7 will be in frictional seating engagement with the shock-absorbing or cushion element 4 and it will be normally retained in such position by the yieldable devices C, a constant pressure being exerted on the frame 5 by the contact rollers 13, and through the cooperation of the frictionally engaged cushion elements 4 and 7 and the contact and pressure rollers 13 movement of the windshield with respect to its seat is practically entirely obviated and rattling or jarring loose of said windshield during travel movement of the vehicle is prevented. However, should the vehicle be in collision with another vehicle or object or from necessity or otherwise be brought to a sudden stop, contact by the driver or an occupant or otherwise by pressure being exerted on the windshield from inside the car, said windshield from its position shown in Fig. 4 is permitted to move outward against the action of springs 14 by the yielding or expanding movement of the hinged plate members 10 and action of rollers 13 without being marred in the course of its outward movement, and during such movement members 10 move to positions at substantially right angles to their anchor plates 9 and retain gripping engagement with the ends of said windshield until it reaches the position shown in Fig. 5 where it is held, or completely released therefrom, depending upon the force exerted, and whereby injury to the occupant or occupants of the vehicle by sudden contact with said windshield is prevented.

From the above it is apparent that I have designed a safety windshield device including its mounting and yieldable retaining means for automobiles and other self propelling vehicles, without necessitating material change to either the windshield itself or its mounting, and adapted to normally maintain the windshield and supporting frame or vehicle body as a unitary structure, yet permitting ready detachment of said windshield from its mounting and partially or completely from said yieldable retaining means depending upon the pressure exerted thereon from the inside of the vehicle, at the same time being inexpensive to produce, easily installable, pleasing in appearance, and efficient for the purposes intended.

Although in practice it has been found that the form of the invention illustrated in the accompanying drawings and referred to in the above description as the preferred embodiment is the most efficient and practical; yet realizing the conditions concurrent with the adoption of the invention will necessarily vary, I desire to emphasize that various minor changes in details of construction, proportion and arrangement of parts, may be resorted to within the scope of the appended claim without departing from or sacrificing any of the principles of the invention.

Having thus described my invention, what I desire protected by Letters Patent is as set forth in the following claim:

In combination with a vehicle body recessed to form a lateral seat and constituting a mounting, a windshield including a frame normally positioned in said mounting, a shock-absorbing and cushion means secured on said seat, cushion means secured to the inner face of said frame for frictional contact engagement with said first mentioned cushion means to prevent vibration of said frame, a plurality of retaining devices comprising hinged spring control outwardly yieldable roller members tensioned on the outer surface of opposite sides of the frame and including hinged anchor means secured to said vehicle body, whereby said tensioned rollers are adapted to normally maintain said frame seated and said cushion means in frictional contact to prevent vibration of the frame, and yieldably operable when force is applied to said windshield from within the body to release the windshield from its mounting and partially or completely from said devices depending upon the force exerted.

HUGH C. McMAHON.